(12) United States Patent
Stenneth et al.

(10) Patent No.: US 12,372,371 B2
(45) Date of Patent: Jul. 29, 2025

(54) SYSTEM AND METHOD FOR UPDATING MAP DATA

(71) Applicant: HERE Global B.V., Eindhoven (NL)

(72) Inventors: Leon Stenneth, Chicago, IL (US);
Bruce Bernhardt, Wauconda, IL (US);
Advait Mohan Raut, Virar West (IN);
Jingwei Xu, Buffalo Grove, IL (US);
Weimin Huang, Chicago, IL (US);
Yuxin Guan, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 213 days.

(21) Appl. No.: 18/075,925

(22) Filed: Dec. 6, 2022

(65) Prior Publication Data

US 2024/0183682 A1   Jun. 6, 2024

(51) Int. Cl.
  *G06N 20/00*    (2019.01)
  *G01C 21/00*    (2006.01)
  *G01C 21/32*    (2006.01)

(52) U.S. Cl.
  CPC ......... *G01C 21/3815* (2020.08); *G01C 21/32* (2013.01); *G01C 21/3837* (2020.08); *G06N 20/00* (2019.01)

(58) Field of Classification Search
  CPC ............ G01C 21/3815; G01C 21/32; G01C 21/3837; G01C 21/3848; G06N 20/00
  See application file for complete search history.

(56) References Cited

U.S. PATENT DOCUMENTS

| | | |
|---|---|---|
| 9,092,695 B1 | 7/2015 | Ogale |
| 9,141,107 B2 | 9/2015 | Ferguson et al. |
| 9,195,914 B2 | 11/2015 | Fairfield et al. |
| 9,459,626 B2 | 10/2016 | Chen et al. |
| 9,530,313 B2 | 12/2016 | Dannenbring |
| 2016/0189004 A1* | 6/2016 | Anastassov ............ G06F 18/24 382/113 |
| 2019/0220678 A1* | 7/2019 | Guo ......................... G06T 7/73 |
| 2020/0042807 A1 | 2/2020 | Schutzmeier et al. |

OTHER PUBLICATIONS

Seo et al., abstract of "Recognition of Highway Workzones for Reliable Autonomous Driving", IEEE Transactions on Intelligent Transportation Systems, Aug. 2014, 9 pages.

* cited by examiner

*Primary Examiner* — Rodney A Butler
(74) *Attorney, Agent, or Firm* — DITTHAVONG, STEINER, & MLOTKOWSKI

(57) ABSTRACT

The disclosure provides a system, a method, and a computer program product for updating map data. The system, for example, obtains sensor data from one or more user equipment. The sensor data is associated with a road object. Further, the system, determines a first location of a road observation sight and a second location of the road object based on a timestamp associated with the first location. Further, a distance associated with the second location of the road object and a center point of a link, is calculated. The link is a map matched link associated with the second location. Further, the system updates the map data based on the calculated distance.

20 Claims, 12 Drawing Sheets

```
200a1

201a1-1 ──signRecognition {
201a1-2 ──timeStampUTC_ms: 1538085875912
201a1-3 ──positionOffset {
201a1-4 ──lateralOffset_m: -0.7000000000000015
201a1-5 ──longitudinalOffset_m: 3.4000000000000004
201a1-6 ──verticalOffset_m: 6.0
         } roadSignType: START OF CONSTRUCTION
         roadSignPermanency: STATIC
         roadSignValue: "NA"
         roadSignDependencies: OTHER_DEPENDENCY_AS_TEXT
         roadSignValidity: ROAD_SIGN_VALIDITY_UNDEFINED
         roadSignRecognitionType: SIGN_MISMATCHED
         signRecognitionConfidence_percent: 60
         roadSignDependencyText: "NA"
         }
```

FIG. 2A-1

SYSTEM AND METHOD FOR UPDATING MAP DATA

TECHNOLOGICAL FIELD

The present disclosure generally relates to routing and navigation applications, and more particularly relates to systems and methods for updating map data.

BACKGROUND

Various navigation applications are available to aid a user during navigation, for example by providing directions for driving, walking, or other modes of travel. Often, a route traversed or to be traversed by a user encompasses a construction site. Road construction signs e.g. start of construction, lane closed, and detour ahead posted signs as shown are important observations obtained from vehicle sensor data. These signs are observed and reported to a backend cloud in real time as the vehicle travels. These sign observations are then aggregated in the cloud and normally indicate ongoing road work. After such a road work has ended, traffic operators move the signs to the side of the road (e.g. on the sidewalk). Although the signs are moved to the side of the road by the traffic operators after road work is concluded, the signs are still observed and reported by vehicles passing the route near the signs. Hence, false positive road works warnings are created due to the observation of such signs, for example construction related signs, that are on the side of the road and does not affect traffic since road works has ended.

Therefore, it is required to provide a method or a system, which is able to update the map data accurately and dynamically in real time, to manage traffic better.

BRIEF SUMMARY

Accordingly, in order to provide accurate, safe, and reliable navigation applications, it is important to update map data to reflect real time changes in route conditions, like placement of signs on the route. Further, even more safe, and user-oriented navigation services can be provided to the end users. To this end, the data utilized for providing the navigation application, such as navigation assistance should consider accurate and up-to-date navigation instructions for passage of vehicle through various regions and routes. Especially, in the context of navigation assistance for autonomous vehicles and semi-autonomous vehicles, to avoid inaccurate navigation, it is important that the assistance provided is real-time, up-to-date, safe, and accurate. There is a need of a system that may update map data based on the real time observations. Example embodiments of the present disclosure provide a system, a method, and a computer program product for updating map data in order to overcome the challenges discussed above, to provide the solutions envisaged as discussed above.

A system, a method and a computer programmable product are provided for implementing a process of updating map data.

In one aspect, a system for updating map data is disclosed. The system comprises a memory configured to store computer-executable instructions; and at least one processor configured to execute the computer-executable instructions to obtain, from one or more user equipment, sensor data associated with a road object. The at least one processor is further configured to determine a first location of a road observation sight associated with the sensor data. The at least one processor is further configured to determine a second location of the road object based on a timestamp associated with the first location. Also, the at least one processor is configured to calculate a distance associated with the second location of the road object and a center point of a link, wherein the link is a map matched link associated with the second location. Further, the map data is updated based on the calculated distance.

In additional system embodiments, the distance is a length of a perpendicular bisector from the center point of the link to the second location. Further to update the map data based on calculated distance, the at least one processor is further configured to compare the distance with a predefined threshold. Further, the predefined threshold is half of width of the link, associated with the road object.

In additional system embodiments, to update the map data based on calculated distance, the at least one processor is further configured to suppress the road observation associated with the road object when the distance is greater than the predefined threshold.

In additional system embodiments, to update the map data based on calculated distance, the at least one processor is further configured to retain the road observation associated with the road object when the distance is lesser than the predefined threshold.

In additional system embodiments, to update the map data, the at least one processor is further configured to retain the road observation associated with the road object when worker presence or heavy-duty vehicle equipment are observed by the sensor data, associated with one or more user equipment. The at least one processor is further configured to retain the road observation associated with the road object when speed of a vehicle in vicinity of the first location, is above a predefined speed limit, such as a speed limit prescribed in free flow mode of traffic through a route.

In additional system embodiments, the at least one processor is further configured to filter construction related road objects from a plurality of road objects. Further, to filter construction related road objects, the at least one processor is further configured to apply a machine learning algorithm on the road observations associated with the plurality of road objects.

In another aspect, a method for updating map data is provided. The method comprises obtaining, from one or more user equipment, sensor data associated with a road object. The method further comprises determining a first location of a road observation sight associated with the sensor data. The method further comprises determining a second location of the road object based on a timestamp associated with the first location. Further, the method comprises calculating a distance associated with the second location of the road object and a center point of a link, wherein the link is a map matched link associated with the second location. Further, the map data is updated based on the calculated distance.

In additional method embodiments, the distance is a length of a perpendicular bisector from the center point of the link to the second location. Further, for updating the map data based on calculated distance, the method comprises comparing the distance with a predefined threshold. The predefined threshold is half of width of the link, associated with the road object.

In additional method embodiments, for updating the map data based on calculated distance, the method further comprises suppressing the road observation associated with the road object when the distance is greater than the predefined threshold. The method further comprises retaining the road observation associated with the road object when the distance is lesser than the predefined threshold.

In additional method embodiments, for updating the map data based on calculated distance, the method further comprises retaining the road observation associated with the road object when worker presence or heavy-duty vehicle equipment are observed by the sensor data, associated with one or more user equipment. The method further comprises retaining the road observation associated with the road object when speed of a vehicle in vicinity of the first location, is above a predefined speed limit, such as a speed limit prescribed in free flow mode of traffic through a route.

In additional method embodiments, the method further comprises filtering construction related road objects from a plurality of road object. Further, for filtering construction related road objects, a machine learning algorithm is applied on the corresponding road observations associated with the plurality of road objects.

In additional method embodiments, for filtering construction related road objects, the method further comprises maintaining a list, where the list contains locations of road object placed on the side of a link. Further, the method comprises blacklisting the list, where the blacklisting indicates that construction information is present but does not interfere with safe travel.

In yet another aspect, a computer program product comprising a non-transitory computer readable medium having stored thereon computer executable instructions which when executed by at least one processor, cause the processor to carry out operations for generating a feature line, the operations comprising obtaining, from one or more user equipment, sensor data associated with a road object. Further, the operations comprise determining a first location of a road observation sight associated with the sensor data. Additionally, the operations comprise determining a second location of the road object based on a timestamp associated with the first location. Further, the operations comprise calculating a distance associated with the second location of the road object and a center point of a link, wherein the link is a map matched link associated with the second location. Additionally, the operations comprise updating the map data based on the calculated distance.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
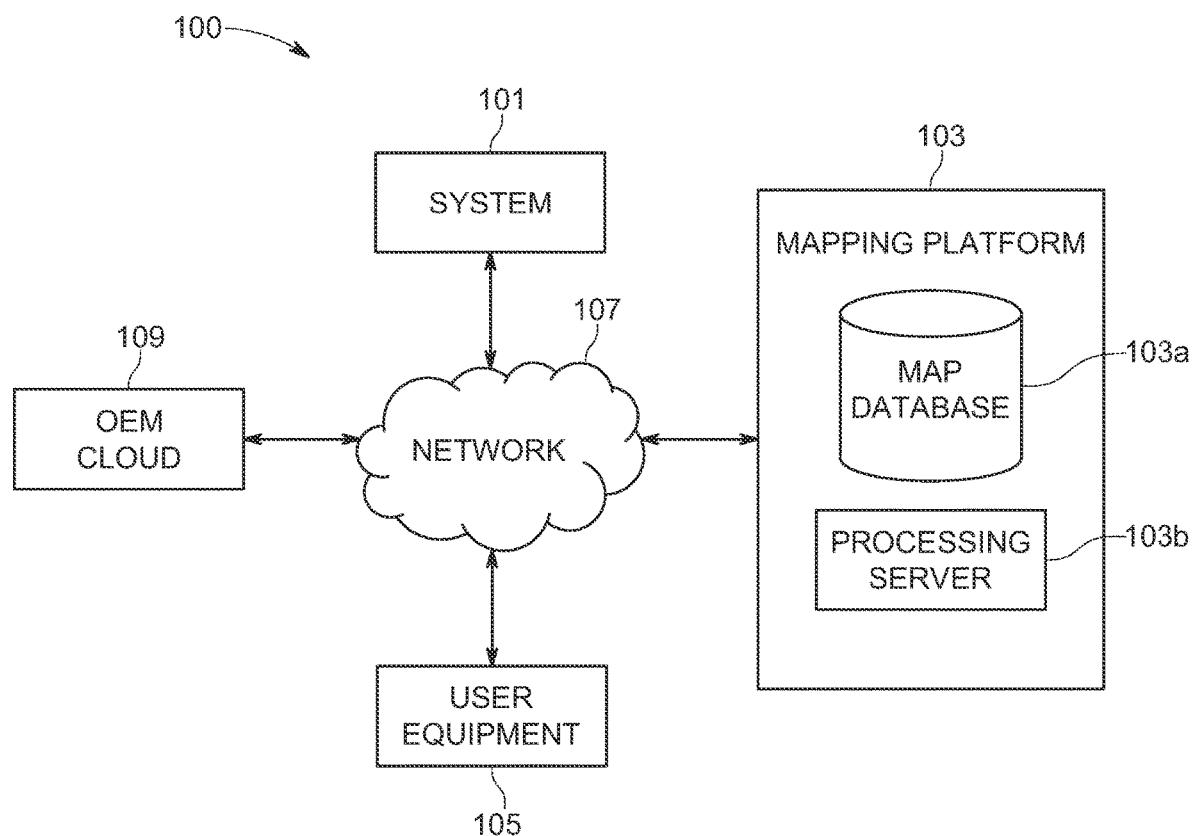
Figure 2A:
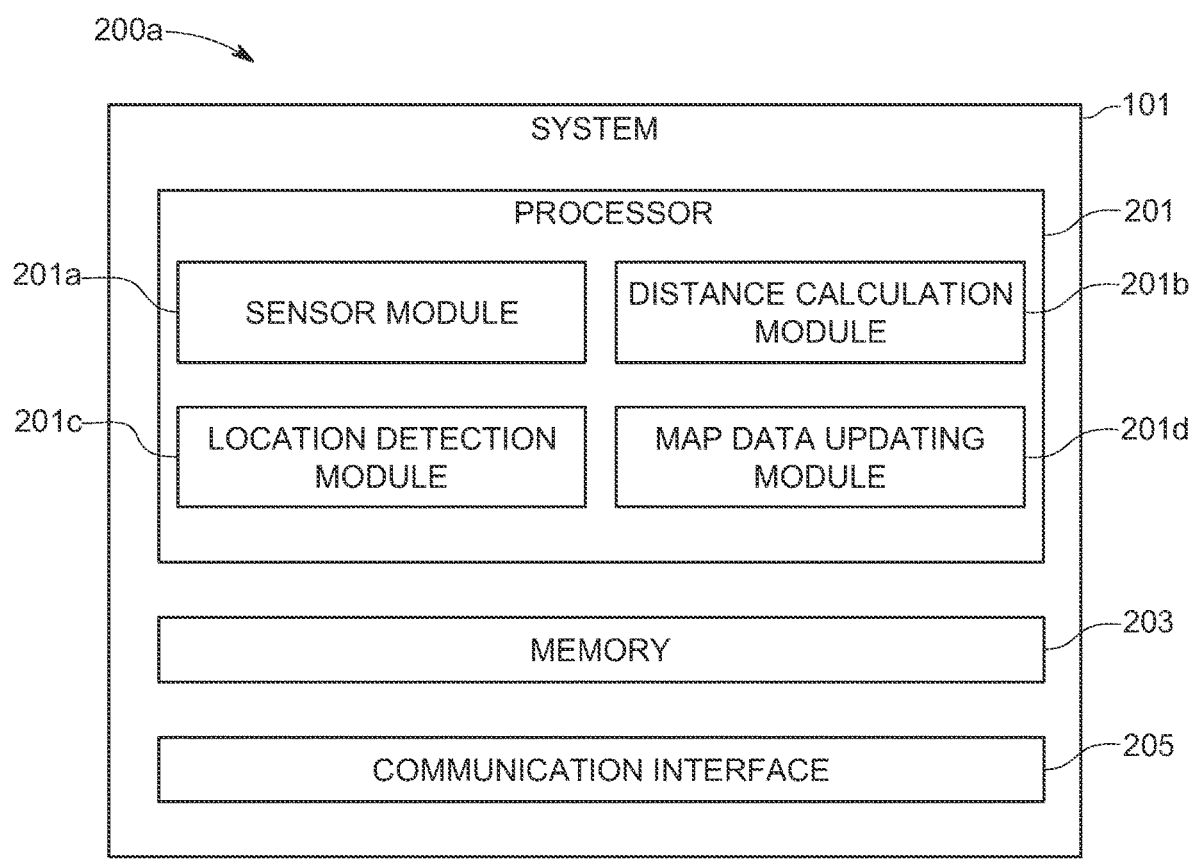
Figures 2, 2A:
Figure 2B:
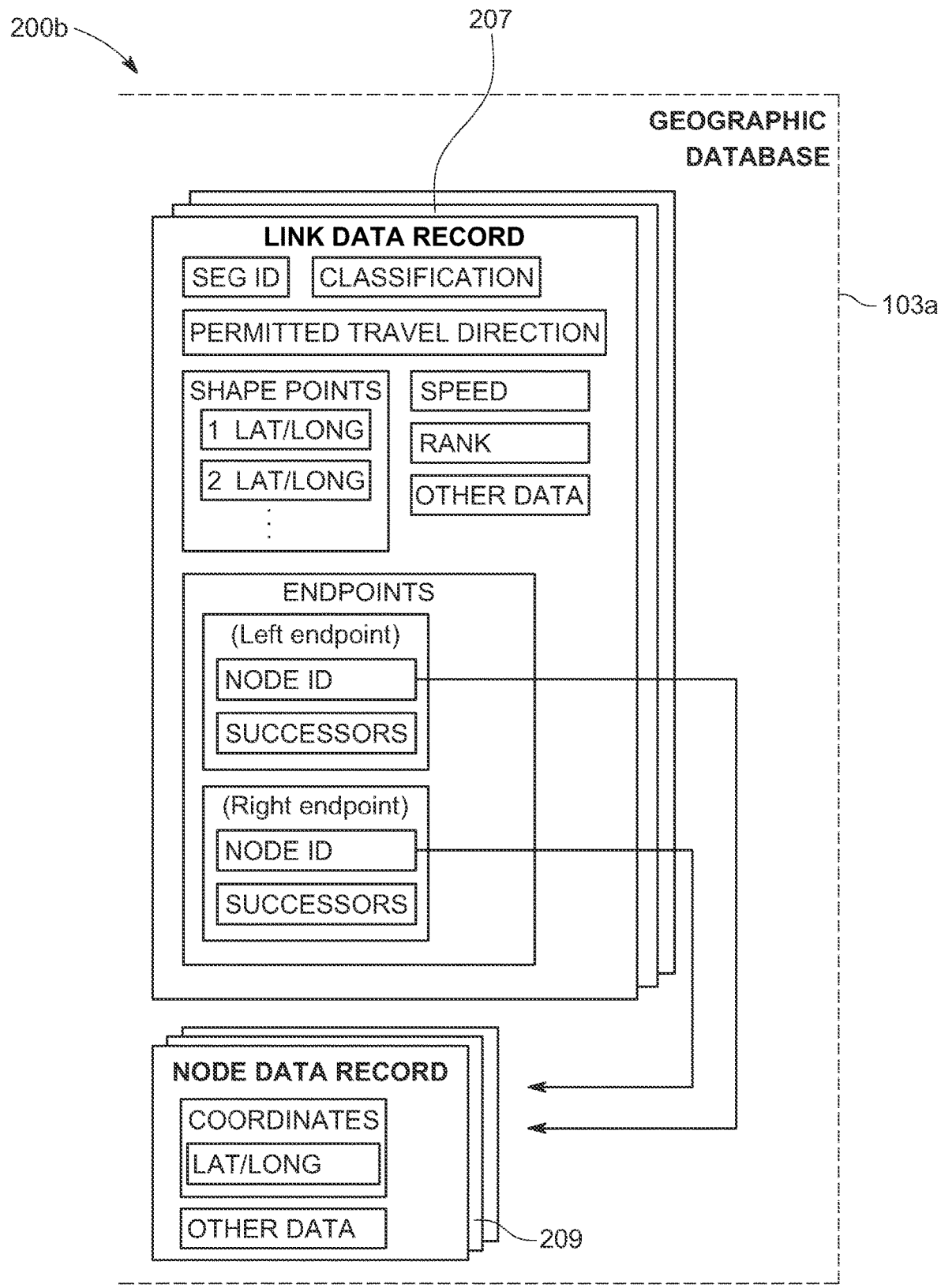
Figure 2C:
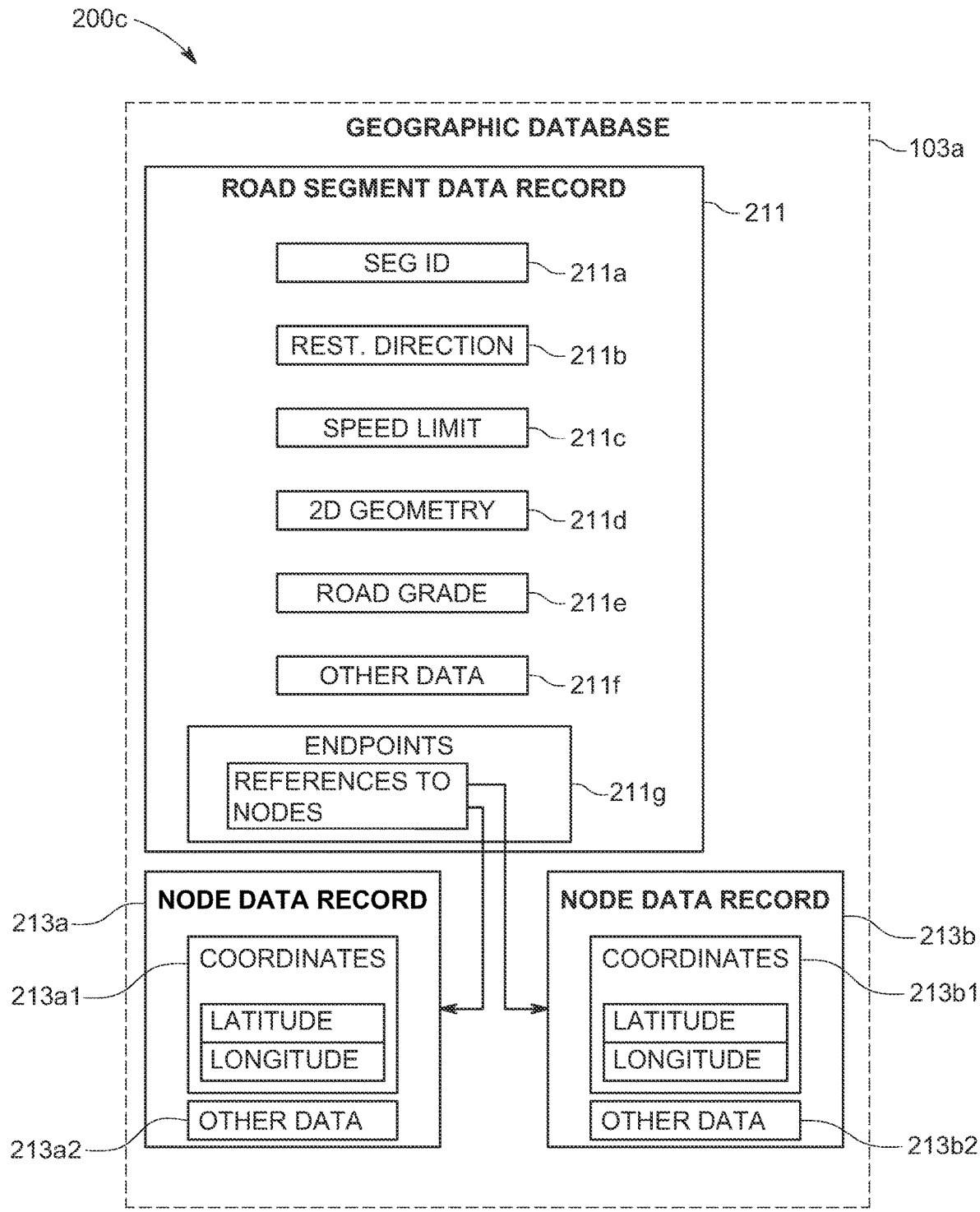
Figure 2D:
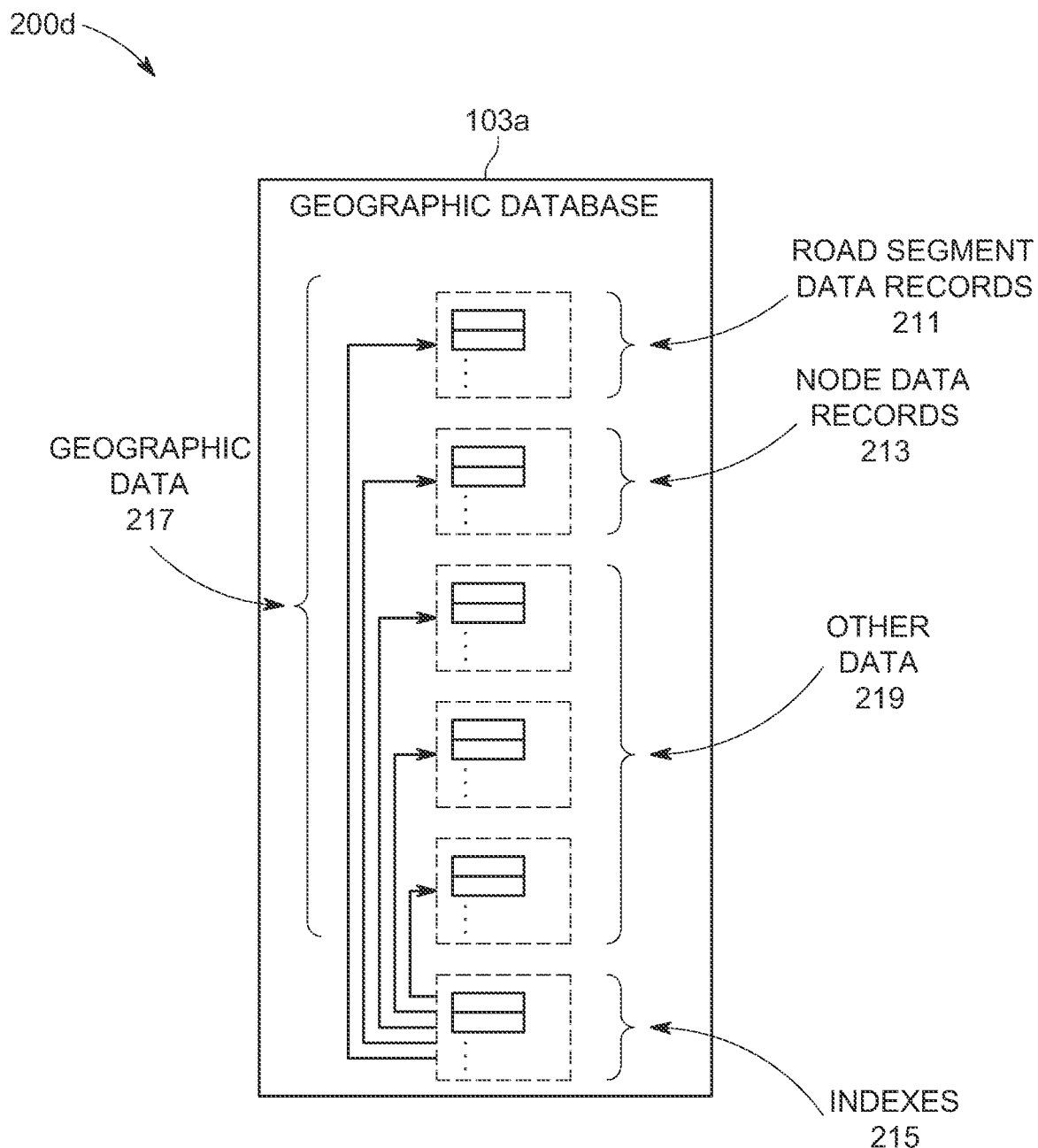
Figure 3B:
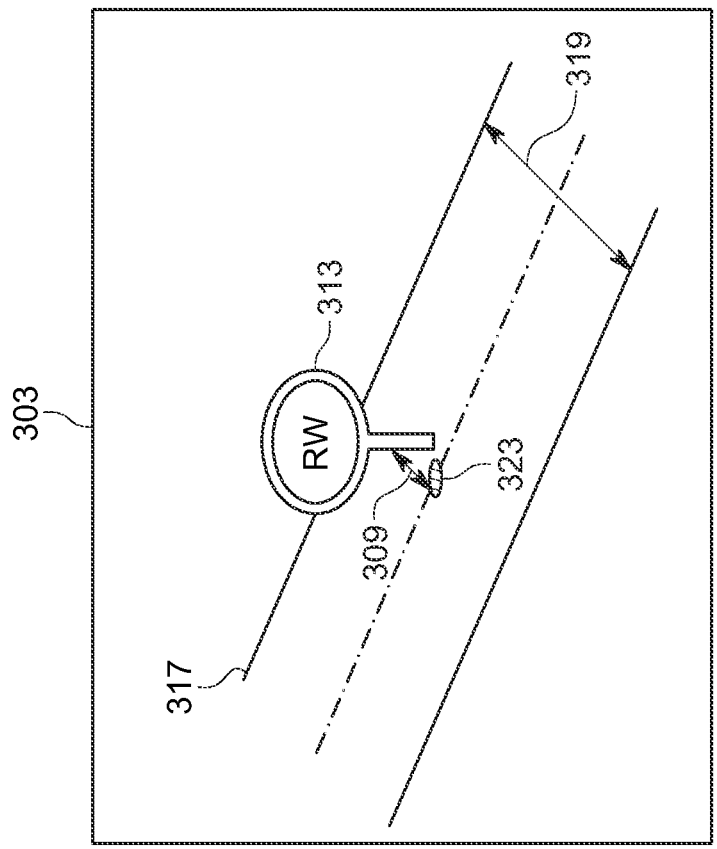
Figure 3A:
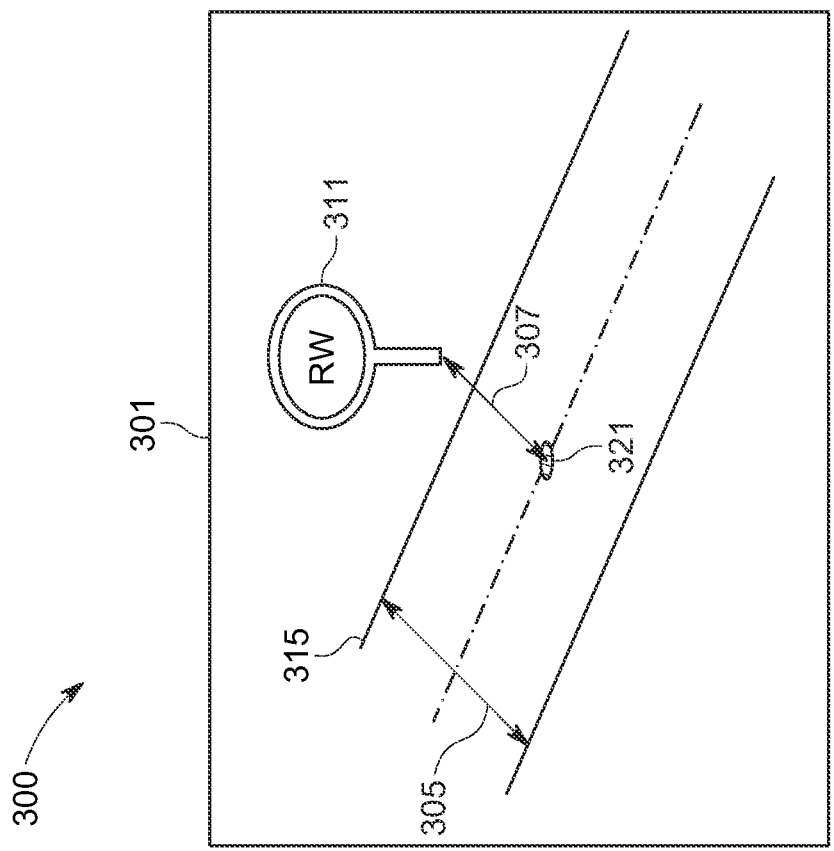
Figure 4A:
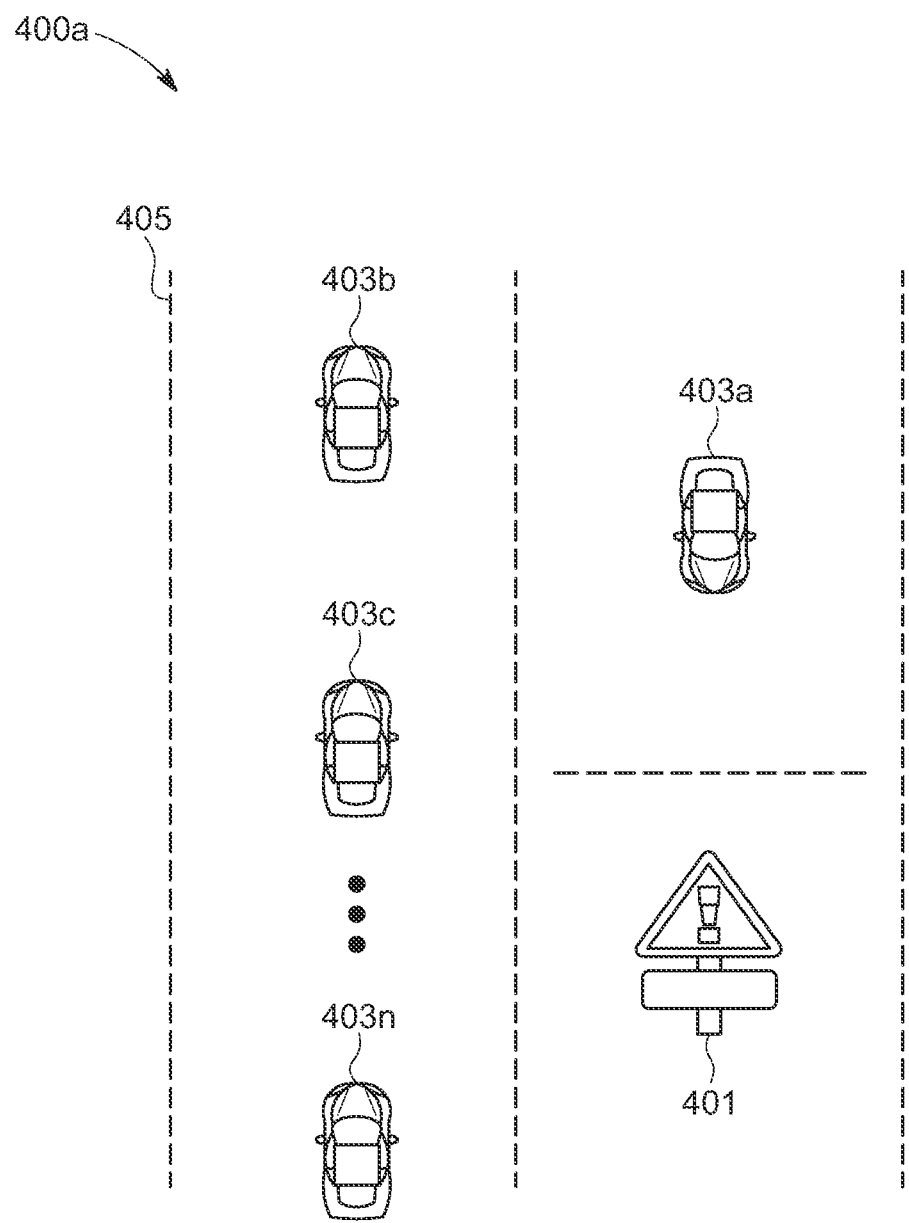
Figure 4B:
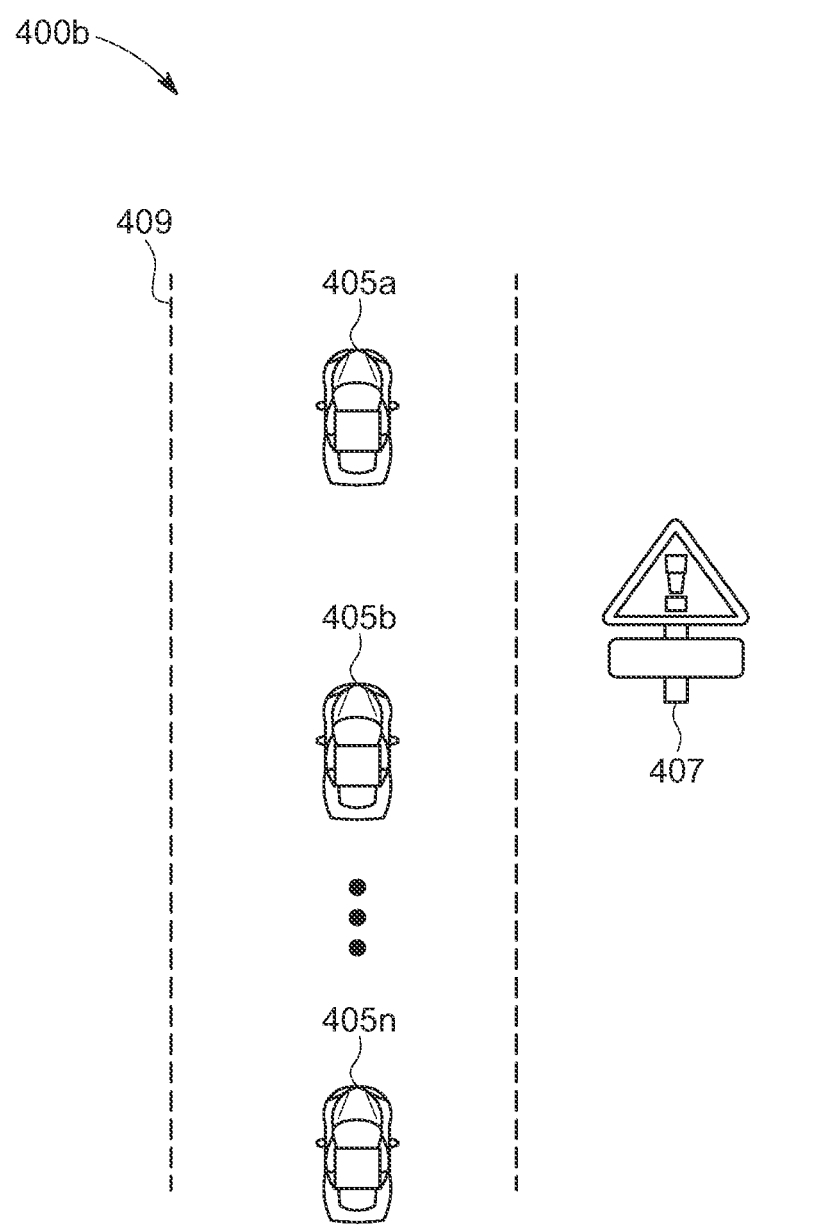
Figure 5:
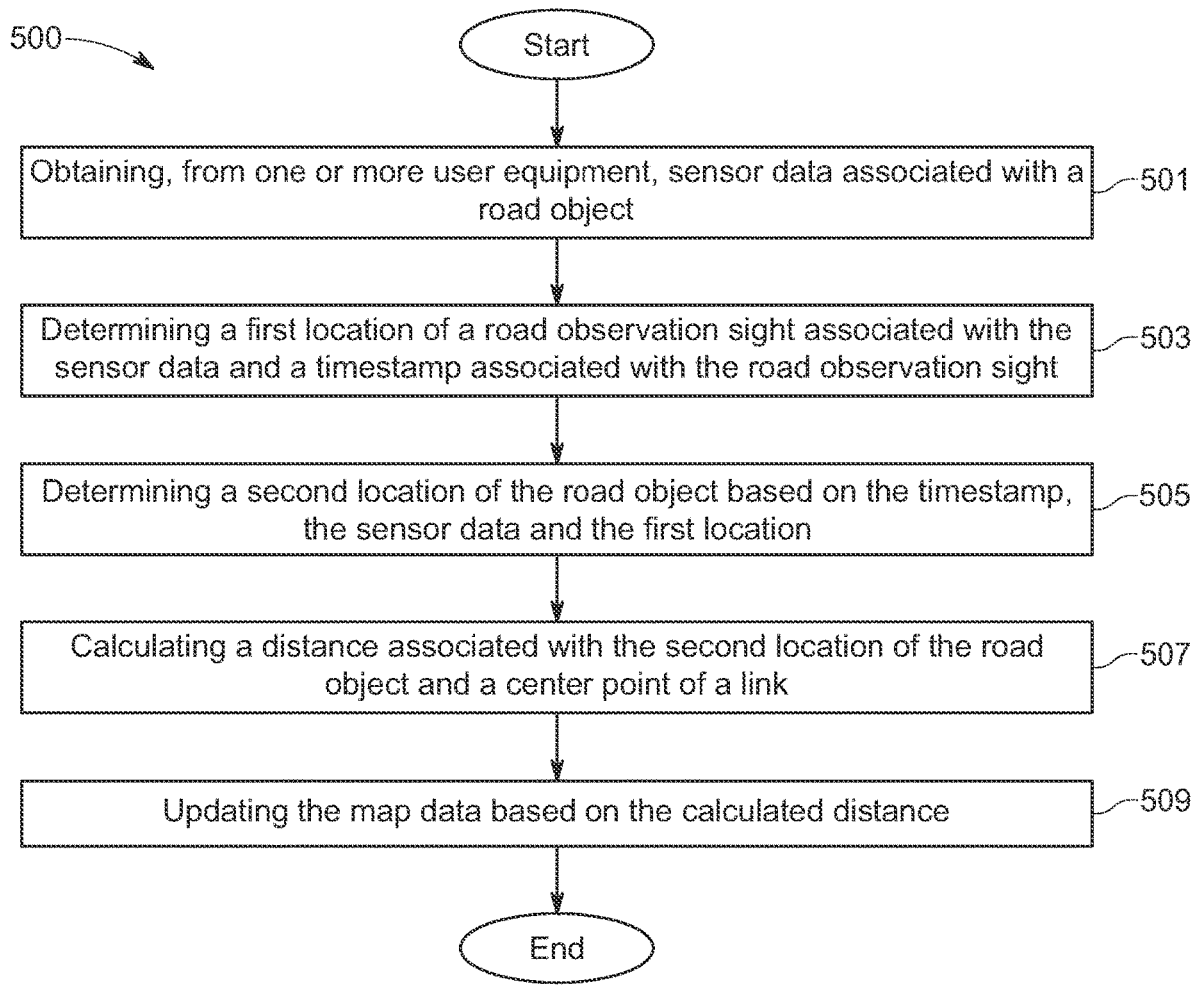
Figure 6:
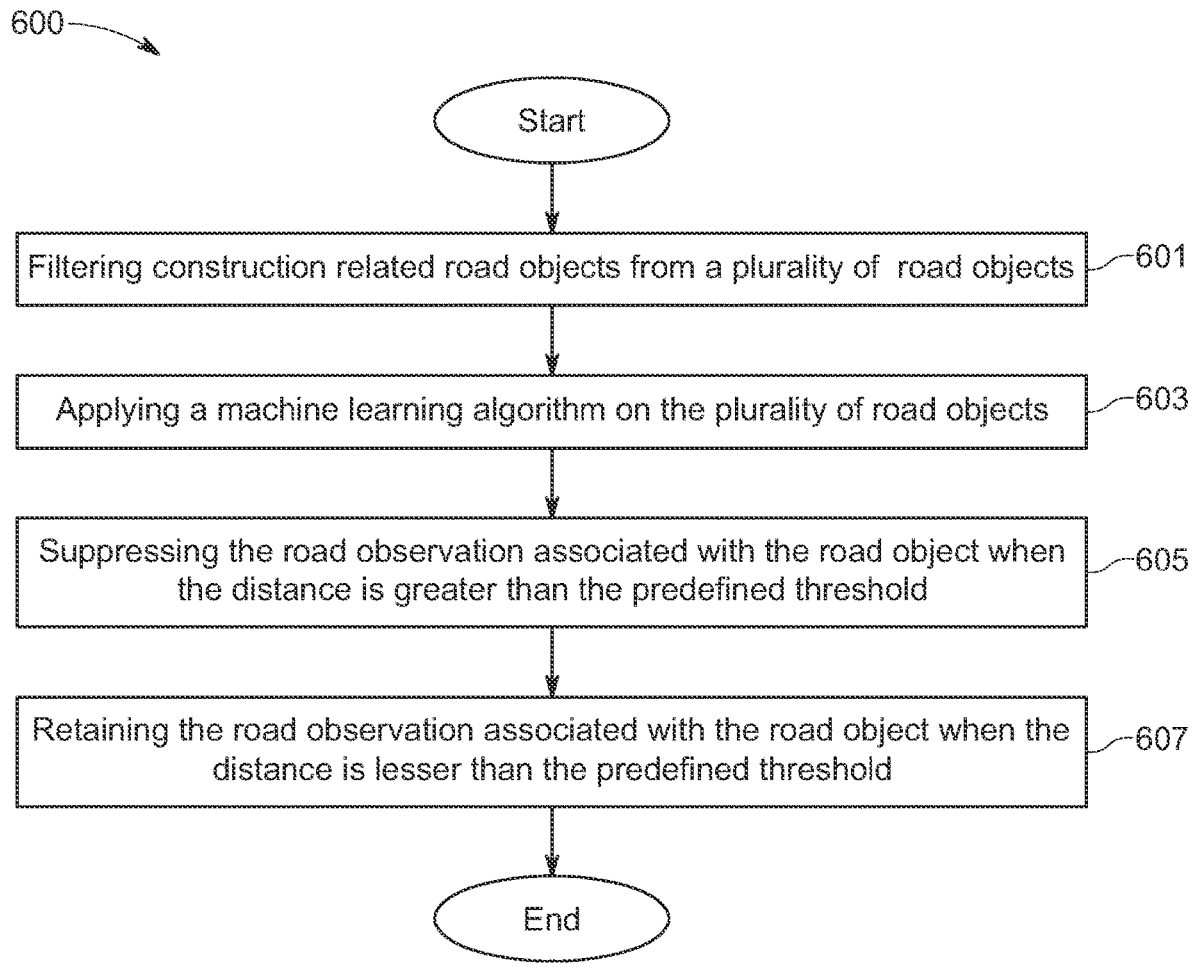

Having thus described example embodiments of the invention in general terms, reference will now be made to the accompanying drawings, which are not necessarily drawn to scale, and wherein:

FIG. 1 illustrates a schematic diagram of a network environment of a system for updating map data, in accordance with an example embodiment;

FIG. 2A illustrates a block diagram of the system for updating map data, in accordance with an example embodiment;

FIG. 2A-1 illustrates working of a location detection module, in accordance with an example embodiment;

FIG. 2A-2 illustrates working of a location detection module, in accordance with an example embodiment;

FIG. 2B illustrates an exemplary map database record storing data, in accordance with one or more example embodiments;

FIG. 2C illustrates another exemplary map database record storing data, in accordance with one or more example embodiments;

FIG. 2D illustrates another exemplary map database storing data, in accordance with one or more example embodiments;

FIG. 3A-FIG. 3B collectively illustrate schematic diagrams of working examples of the system of FIG. 2A, in accordance with an example embodiment;

FIG. 4A illustrates an exemplary scenario of a working example of the system for updating map data, in accordance with an example embodiment;

FIG. 4B illustrates an exemplary scenario of a working example of the system for updating map data, in accordance with an example embodiment;

FIG. 5 illustrates a flow diagram of a method for updating map data, in accordance with an example embodiment; and FIG. 6 illustrates another flow diagram of a method for updating map data, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses, and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "route" may be used to refer to a path from a source location to a destination location on any link.

The term "autonomous vehicle" may refer to any vehicle having autonomous driving capabilities at least in some conditions. The autonomous vehicle may also be known as a driverless car, robot car, self-driving car, or autonomous car. For example, the vehicle may have zero passengers or passengers that do not manually drive the vehicle, but the vehicle drives and maneuvers automatically. There can also be semi-autonomous vehicles.

End of Definitions

Embodiments of the present disclosure may provide a system, a method, and a computer program product for updating map data. The map data may be associated with a region, such as a construction site. After completion of road work, construction related signs are moved to the side of a link. Such construction related signs are still observed by sensors of vehicles passing through the region. Thus, such false observation of construction related signs such as, lane detour, construction site ahead, lane closed etc., may indicate ongoing road work even after road work has ended. It may further cause unnecessary transition from autonomous mode to manual mode, in autonomous or semi-autonomous vehicles. It may be bothersome and unnecessary for users due to a number of reasons. To that end, it would be advantageous to provide methods and systems that facilitate updated navigation instructions related to routing of traffic in the presence of such signs. The methods and systems disclosed herein provide the users an ability to take navigation decisions based on updated navigation data based on the real time data.

In this manner, the methods and systems disclosed herein may provide efficient and user-friendly techniques for updating navigation instructions. Further, in some embodiments, most of the processing is done by a remote server based or cloud-based server, so the user may be able to leverage fast processing and improved storage benefits provided by the systems and methods disclosed herein. Further, data for generating navigation instructions using the methods and systems disclosed herein may be gathered through a number of techniques, such as historical map data usage, real time data from map service providers and the like. Thus, the navigation instructions may be generated based on up-to-date and real time data, providing accurate and reliable navigation services to the users. These and other technical improvements of the invention will become evident from the description provided herein.

The system, the method, and the computer program product facilitating updating map data are described with reference to FIG. 1 to FIG. 6.

FIG. 1 illustrates a schematic diagram of a network environment 100 of a system 101 for updating map data, in accordance with an example embodiment. The system 101 may be communicatively coupled to a mapping platform 103, a user equipment 105 and an OEM (Original Equipment Manufacturer) cloud 109, via a network 107. The components described in the network environment 100 may be further broken down into more than one component such as one or more sensors or application in user equipment and/or combined together in any suitable arrangement. Further, it is possible that one or more components may be rearranged, changed, added, and/or removed without deviating from the scope of the present disclosure.

In an example embodiment, the system 101 may be embodied in one or more of several ways as per the required implementation. For example, the system 101 may be embodied as a cloud-based service, a cloud-based application, a remote server-based service, a remote server-based application, a virtual computing system, a remote server platform or a cloud-based platform. As such, the system 101 may be configured to operate outside the user equipment 105. However, in some example embodiments, the system 101 may be embodied within the user equipment 105, for example as a part of an in-vehicle navigation system, a navigation app in a mobile device and the like. In each of such embodiments, the system 101 may be communicatively coupled to the components shown in FIG. 1 to carry out the desired operations and wherever required modifications may be possible within the scope of the present disclosure. The system 101 may be implemented in a vehicle, where the vehicle may be an autonomous vehicle, a semi-autonomous vehicle, or a manually driven vehicle. In an embodiment, the system 101 may be deployed in a consumer vehicle to generate navigation information in a region. Further, in one embodiment, the system 101 may be a standalone unit configured to generate navigation information in the region for the vehicle. Alternatively, the system 101 may be coupled with an external device such as the autonomous vehicle. In some embodiments, the system 101 may be a processing server 103b of the mapping platform 103 and therefore may be co-located with or within the mapping platform 103. In some other embodiments, the system 101 may be an OEM (Original Equipment Manufacturer) cloud, such as the OEM cloud 109. The OEM cloud 109 may be configured to anonymize any data received from the system 101, such as the vehicle, before using the data for further processing, such as before sending the data to the mapping platform 103. In some embodiments, anonymization of data may be done by the mapping platform 103.

The mapping platform 103 may comprise a map database 103a for storing map data and a processing server 103b. The map database 103a may store node data, road segment data, link data, point of interest (POI) data, link identification information, heading value records, data about various geographic zones, regions, pedestrian data for different regions, heatmaps or the like. Also, the map database 103a further includes speed limit data of different lanes, cartographic data, routing data, and/or maneuvering data. Additionally, the map database 103a may be updated dynamically to cumulate real time traffic data. The real time traffic data may be collected by analyzing the location transmitted to the mapping platform 103 by a large number of road users through the respective user devices of the road users. In one example, by calculating the speed of the road users along a length of road, the mapping platform 103 may generate a live traffic map, which is stored in the map database 103a in the form of real time traffic conditions. In an embodiment, the map database 103a may store data of different zones in a region. In one embodiment, the map database 103a may further store historical traffic data that includes travel times, average speeds and probe counts on each road or area at any given time of the day and any day of the year. In an embodiment, the map database 103a may store the probe data over a period of time for a vehicle to be at a link or road at a specific time. The probe data may be collected by one or more devices in the vehicle such as one or more sensors or image capturing devices or mobile devices. In an embodiment, the probe data may also be captured from connected-car sensors, smartphones, personal navigation devices, fixed road sensors, smart-enabled commercial vehicles, and expert monitors observing accidents and construction. In an embodiment, the map data in the map database 103a may be in the form of map tiles. Each map tile may denote a map tile area comprising plurality of road segments or links in it. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network used by vehicles such as cars, trucks, buses, motorcycles, and/or other entities. Optionally, the map database 103a may contain path segment and node data records, such as shape points or other data that may represent pedestrian paths, links, or areas in addition to or instead of the vehicle road record data, for example. The road/link and nodes can be associated with attributes, such as geographic coordinates, street names, address ranges, speed limits, turn restrictions at intersections, and other navigation related attributes. The map database 103a may also store data about the POIs and their respective locations in the POI records. The map database 103a may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 103a may include event data (e.g., traffic incidents, construction activities, scheduled events, unscheduled events, accidents, diversions etc.) associated with the POI data records or other records of the map database 103a associated with the mapping platform 103. Optionally, the map database 103a may contain path segment and node data records or other data that may represent pedestrian paths or areas in addition to or instead of the autonomous vehicle road record data.

In some embodiments, the map database 103a may be a master map database stored in a format that facilitates updating, maintenance and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, navigation instruction generation and other functions, by a navigation device, such as by the user equipment 105. The navigation-related functions may correspond to vehicle navigation, pedestrian navigation, navigation instruction suppression, navigation instruction generation based on user preference data or other types of navigation. The compilation to produce the end user databases may be performed by a party or entity separate from the map developer. For example, a customer of the map developer, such as a navigation device developer or other end user device developer, a navigation app service provider and the like may perform compilation on a received map database in a delivery format to produce one or more compiled navigation databases.

As mentioned above, the map database 103a may be a master geographic database, but in alternate embodiments, the map database 103a may be embodied as a client-side map database and may represent a compiled navigation database that may be used in or with end user equipment such as the user equipment 105 to provide navigation and/or map-related functions. For example, the map database 103a may be used with the user equipment 105 to provide an end user with navigation features. In such a case, the map database 103a may be downloaded or stored locally (cached) on the user equipment 105.

The processing server 103b may comprise processing means, and communication means. For example, the processing means may comprise one or more processors configured to process requests received from the user equipment 105. The processing means may fetch map data from the map database 103a and transmit the same to the user equipment 105 via OEM cloud 109 in a format suitable for use by the user equipment 105. In one or more example embodiments, the mapping platform 103 may periodically communicate with the user equipment 105 via the processing server 103b to update a local cache of the map data stored on the user equipment 105. Accordingly, in some example embodiments, the map data may also be stored on the user equipment 105 and may be updated based on periodic communication with the mapping platform 103.

In some example embodiments, the user equipment 105 may be any user accessible device such as a mobile phone, a smartphone, a portable computer, and the like, as a part of another portable/mobile object such as a vehicle. The user equipment 105 may comprise a processor, a memory, and a communication interface. The processor, the memory and the communication interface may be communicatively coupled to each other. In some example embodiments, the user equipment 105 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example embodiments, the user equipment 105 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment 105. Additional, different, or fewer components may be provided. In one embodiment, the user equipment 105 may be directly coupled to the system 101 via the network 107. For example, the user equipment 105 may be a dedicated vehicle (or a part thereof) for gathering data for development of the map data in the database 103a. In some example embodiments, at least one user equipment such as the user equipment 105 may be coupled to the system 101 via the OEM cloud 109 and the network 107. For example, the user equipment 105 may be a consumer vehicle (or a part thereof) and may be a beneficiary of the services provided by the system 101. In some example embodiments, the user equipment 105 may serve the dual purpose of a data gatherer and a beneficiary device. The user equipment 105 may be configured to capture sensor data associated with a road which the user equipment 105 may be traversing. The sensor data may for example be image data of road objects, road signs, or the surroundings. The sensor data may refer to sensor data collected from a sensor unit in the user equipment 105. In accordance with an embodiment, the sensor data may refer to the data captured by the vehicle using sensors. The user equipment 105, may be communicatively coupled to the system 101, the mapping platform 103 and the OEM cloud 109 over the network 107.

The network 107 may be wired, wireless, or any combination of wired and wireless communication networks, such as cellular, Wi-Fi, internet, local area networks, or the like. In one embodiment, the network 107 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. In an embodiment the network 107 is coupled directly or indirectly to the user equipment 105 via the OEM cloud 109. In an example embodiment, the system may be integrated in the user equipment 105. In an example, the mapping platform 103 may be integrated into a single platform to provide a suite of mapping and navigation related applications for OEM devices, such as the user devices and the system 101. The system 101 may be configured to communicate with the mapping platform 103 over the network 107. Thus, the mapping platform 103 may enable provision of cloud-based services for the system 101, such as, updating data about road signs in the OEM cloud 109 in batches or in real-time.

FIG. 2A illustrates a block diagram 200a of the system 101 for updating map data, in accordance with an example embodiment. The system 101 may include at least one processor 201 (hereinafter, also referred to as "processor 201"), at least one memory 203 (hereinafter, also referred to as "memory 203"), and at least one communication interface 205 (hereinafter, also referred to as "communication interface 205"). The processor 201 may include a sensor module 201a, a distance calculation module 201b, a location detection module 201c and a map data updating module 201d. The processor 201 may retrieve computer program code instructions that may be stored in the memory 203 for execution of the computer program code instructions.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally, or alternatively, the processor 201 may include one or more processors configured in tandem via the bus to enable independent execution of instructions, pipelining and/or multithreading.

In some embodiments, the processor 201 may be configured to provide Internet-of-Things (IoT) related capabilities to users of the system 101. In some embodiments, the users may be or correspond to an autonomous or a semi-autonomous vehicle. The IoT related capabilities may in turn be used to provide smart navigation solutions by providing real time updates to the users to take pro-active decision on turn-maneuvers, lane changes and the like, big data analysis, traffic redirection, and sensor-based data collection by using the cloud-based mapping system for providing navigation recommendation services to the users. The system 101 may be accessed using the communication interface 205. The communication interface 205 may provide an interface for accessing various features and data stored in the system 101. Further, from the user equipment 105, at least one location on map is received.

Additionally, or alternatively, the processor 201 may include one or more processors capable of processing large volumes of workloads and operations to provide support for big data analysis. In an example embodiment, the processor 201 may be in communication with the memory 203 via a bus for passing information among components coupled to the system 101.

The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to conduct various functions in accordance with an example embodiment of the present invention. For example, the memory 203 may be configured to buffer input data for processing by the processor 201.

As exemplarily illustrated in FIG. 2A, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

The sensor module 201a may include acoustic sensors such as a microphone array, position sensors such as a GPS sensor, a gyroscope, a LIDAR sensor, a proximity sensor, motion sensors such as accelerometer, an image sensor such as a camera and the like. The sensor module 201a may be configured to receive sensor data from the user equipment 105. The sensor data may be associated with a road object. The road object includes various types of objects that are encountered on a route of travel of the user equipment. For example, when the user equipment 105 is a vehicle, the road object may be a road sign, such as a construction related sign, a speed limit sign, a road works detection sign, a traffic cone, a guide rail, and the like. In one embodiment, the camera associated with the vehicle captures the road sign in the form of a road observation. For example, the road observation may be in the form of a Sensor Data Ingestion Interface (SDII) message format (explained later). Once the sensor data in the form of the road observation is received by the sensor module 201a, the sensor data is processed to extract information related to a first location at which the road observation sight was made.

To that end, the location detection module 201a is configured to process the sensor data messages received by the sensor module 201a. The location detection module 201c determines a timestamp value included in the sensor data of the road observation sight, which is in the form of a first message. The first message may be for example a signRecognition message. This timestamp value is matched with a timestamp value of a second message received by the sensor module 210a. This second message is for example a positionEstimate message. Based on this timestamp matching, the first location is determined as the location information included in the second message. The timestamp matching is further explained in detail in FIG. 2A-1 and FIG. 2A-2.

Further, the location detection module 201c is configured to apply the positionOffsets in the signRecognition message to the first location identified from the previous step, to identify the second location. This second location is the location of the road object, or the sign, which is determined by using all of the previous information like the timestamp used for matching, the first location and the data included in the second message of the sensor data.

Further, the distance calculation module 201b, in the processor 201, may be configured to determine a length of a perpendicular bisector from the second location of the road object to the center of a link. The link in this embodiment is a map matched link associated with the second location. This distance calculation will be further explained in detail in FIG. 3A and FIG. 3B.

Based on this calculated distance, the map data may be updated by the map data updating module 201d. The map data updating module 201d may include a remote server, a cloud-based server, and a map database. The cloud-based server may be an OEM (Original Equipment Manufacturer) cloud, such as the OEM cloud 109. The updated map data may then be used for further communication in navigation applications involving the system 101, by suitable access mechanisms provided by the communication interface 205 module.

The communication interface 205 may comprise input interface and output interface for supporting communications to and from the user equipment 105 or any other component with which the system 101 may communicate. The communication interface 205 may be any means such as a device or circuitry embodied in either hardware or a combination of hardware and software that is configured to receive and/or transmit data to/from a communications device in communication with the user equipment 105. In this regard, the communication interface 205 may include, for example, an antenna (or multiple antennae) and supporting hardware and/or software for enabling communications with a wireless communication network. Additionally, or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms for enabling the system 101 to carry out information exchange functions in many different forms of communication environments. The communication interface enables exchange of information and instructions for updating map data stored in the map database 103a.

FIG. 2A-1 illustrates working of a location detection module, in accordance with an example embodiment. The location detection module 201c determines a timestamp value 201a1-2 included in the sensor data of the road observation sight, which is in the form of a first message. The first message may be for example a signRecognition message 201a1-1. The location detection module 201c extracts the timestamp 201a1-2 of the signRecognition message 201a1-1. This timestamp value 201a1-2 is matched with a timestamp value 201a2-2 of a second message 200a2-1 shown in FIG. 2A-2, received by the sensor module 201a. Based on this timestamp matching, the first location is a latitude_deg 201a2-3 and a longitude_deg 201a2-4 in the matching positonEstimate message which is depicted as the second message 201a2-1.

FIG. 2A-2 illustrates a format 200a2 of the second message 200a2-1 processed by the location detection module 201c, to determine the second location, in accordance with an example embodiment. Further, the location detection module 201c is configured to apply positionOffsets 201a1-3, in the signRecognition message 201a1-1 to the first location identified from the previous step, to identify the second location. The positionoffsets 210a1-3 include a lateral offset 201a1-4, a longitudinal offset 201a1-5, and a vertical offset 201a1-6. The timestamp value 201a1-2 is matched with the timestamp value 201a2-2 of the second message 200a2-1 received by the sensor module 201a. This second location is the location of the road object, or the sign, which is determined by using all of the previous information like the timestamp used for matching, the first location and the data included in the second message of the sensor data.

The second location is then further used for determining whether the road observation is a true sign observation or a false positive sign observation, and further the map database 103a and the data stored in it is updated based on the determination.

FIG. 2B shows format of the map data 200b stored in the map database 103a according to one or more example embodiments. FIG. 2B shows a link data record 207 that may be used to store data about one or more of the feature lines. This link data record 207 has information (such as "attributes", "fields", etc.) associated with it that allows identification of the nodes associated with the link and/or the geographic positions (e.g., the latitude and longitude coordinates and/or altitude or elevation) of the two nodes. In addition, the link data record 207 may have information (e.g., more "attributes", "fields", etc.) associated with it that specify the permitted speed of travel on the portion of the road represented by the link record, the direction of travel permitted on the road portion represented by the link record, what, if any, turn restrictions exist at each of the nodes which correspond to intersections at the ends of the road portion represented by the link record, the street address ranges of the roadway portion represented by the link record, the name of the road, and so on. The various attributes associated with a link may be included in a single data record or are included in more than one type of record which are referenced to each other.

Each link data record 207 that represents another-than-straight road segment may include shape point data. A shape point is a location along a link between its endpoints. To represent the shape of other-than-straight roads, the mapping platform 103 and its associated map database developer selects one or more shape points along the other-than-straight road portion. Shape point data included in the link data record 207 indicate the position, (e.g., latitude, longitude, and optionally, altitude or elevation) of the selected shape points along the represented link.

Additionally, in the compiled geographic database, such as a copy of the map database 103a, there may also be a node data record 209 for each node. The node data record 209 may have associated with it information (such as "attributes", "fields", etc.) that allows identification of the link(s) that connect to it and/or its geographic position (e.g., its latitude, longitude, and optionally altitude or elevation).

In some embodiments, compiled geographic databases are organized to facilitate the performance of various navigation-related functions. One way to facilitate performance of navigation-related functions is to provide separate collections or subsets of the geographic data for use by specific navigation-related functions. Each such separate collection includes the data and attributes needed for performing the particular associated function but excludes data and attributes that are not needed for performing the function. Thus, the map data may be alternately stored in a format suitable for performing types of navigation functions, and further may be provided on-demand, depending on the type of navigation function.

FIG. 2C shows another format of the map data 200c stored in the map database 103a according to one or more example embodiments. In the FIG. 2C, the map data 200c is stored by specifying a road segment data record 211. The road segment data record 211 is configured to represent data that represents a road network. In FIG. 2C, the map database 103a contains at least one road segment data record 211 (also referred to as "entity" or "entry") for each road segment in a geographic region.

The map database 103a that represents the geographic region of FIG. 2A also includes a database record 213 (a node data record 213a and a node data record 213b) (or "entity" or "entry") for each node associated with the at least one road segment shown by the road segment data record 211. (The terms "nodes" and "segments" represent only one terminology for describing these physical geographic features and other terminology for describing these features is intended to be encompassed within the scope of these concepts). Each of the node data records 213a and 213b may have associated information (such as "attributes", "fields", etc.) that allows identification of the road segment(s) that connect to it and/or its geographic position (e.g., its latitude and longitude coordinates).

FIG. 2C shows some of the components of the road segment data record 211 contained in the map database 103a. The road segment data record 211 includes a segment ID 211a by which the data record can be identified in the map database 103a. Each road segment data record 211 has associated with it information (such as "attributes", "fields", etc.) that describes features of the represented road segment. The road segment data record 211 may include data 211b that indicate the restrictions, if any, on the direction of vehicular travel permitted on the represented road segment. The road segment data record 211 includes data 211c that indicate a static speed limit or speed category (i.e., a range indicating maximum permitted vehicular speed of travel) on the represented road segment. The static speed limit is a term used for speed limits with a permanent character, even if they are variable in a pre-determined way, such as dependent on the time of the day or weather. The static speed limit is the sign posted explicit speed limit for the road segment, or the non-sign posted implicit general speed limit based on legislation.

The road segment data record 211 may also include data 211d indicating the two-dimensional ("2D") geometry or shape of the road segment. If a road segment is straight, its shape can be represented by identifying its endpoints or nodes. However, if a road segment is other-than-straight, additional information is required to indicate the shape of the road. One way to represent the shape of an other-than-straight road segment is to use shape points. Shape points are points through which a road segment passes between its end points. By providing the latitude and longitude coordinates of one or more shape points, the shape of an other-than-straight road segment can be represented. Another way of representing other-than-straight road segment is with mathematical expressions, such as polynomial splines.

The road segment data record 211 also includes road grade data 211e that indicate the grade or slope of the road segment. In one embodiment, the road grade data 211e include road grade change points and a corresponding percentage of grade change. Additionally, the road grade data 211e may include the corresponding percentage of grade change for both directions of a bi-directional road segment. The location of the road grade change point is represented as a position along the road segment, such as thirty feet from the end or node of the road segment. For example, the road segment may have an initial road grade associated with its beginning node. The road grade change point indicates the position on the road segment wherein the road grade or slope changes, and percentage of grade change indicates a percentage increase or decrease of the grade or slope. Each road segment may have several grade change points depending on the geometry of the road segment. In another embodiment, the road grade data 211e includes the road grade change points and an actual road grade value for the portion of the road segment after the road grade change point until the next road grade change point or end node. In a further embodiment, the road grade data 211e includes elevation data at the road grade change points and nodes. In an alternative embodiment, the road grade data 211e is an elevation model which may be used to determine the slope of the road segment.

The road segment data record 211 also includes data 211g providing the geographic coordinates (e.g., the latitude and longitude) of the end points of the represented road segment. In one embodiment, the data 211g are references to the node data records 211 that represent the nodes corresponding to the end points of the represented road segment.

The road segment data record 211 may also include or be associated with other data 211f that refer to various other attributes of the represented road segment. The various attributes associated with a road segment may be included in a single road segment record or may be included in more than one type of record which cross-reference each other. For example, the road segment data record 211 may include data identifying the name or names by which the represented road segment is known, the street address ranges along the represented road segment, and so on.

FIG. 2C also shows some of the components of the node data record 213 contained in the map database 103a. Each of the node data records 213 may have associated information (such as "attributes", "fields", etc.) that allows identification of the road segment(s) that connect to it and/or it's geographic position (e.g., its latitude and longitude coordinates). For the embodiment shown in FIG. 2C, the node data records 213a and 213b include the latitude and longitude coordinates 213a1 and 213b1 for their nodes. The node data records 213a and 213b may also include other data 213a2 and 213b2 that refer to various other attributes of the nodes.

Thus, the overall data stored in the map database 103a may be organized in the form of different layers for greater detail, clarity, and precision. Specifically, in the case of high-definition maps, the map data may be organized, stored, sorted, and accessed in the form of three or more layers. These layers may include road level layer, lane level layer and localization layer. The data stored in the map database 103a in the formats shown in FIGS. 2B and 2C may be combined in a suitable manner to provide these three or more layers of information. In some embodiments, there may be lesser or fewer number of layers of data also possible, without deviating from the scope of the present disclosure.

FIG. 2D illustrates a block diagram 200d of the map database 103a storing map data or geographic data 217 in the form of road segments/links, nodes, and one or more associated attributes as discussed above. Furthermore, attributes may refer to features or data layers associated with the link-node database, such as an HD lane data layer.

In addition, the map data 217 may also include other kinds of data 219. The other kinds of data 219 may represent other kinds of geographic features or anything else. The other kinds of data may include point of interest data. For example, the point of interest data may include point of interest records comprising a type (e.g., the type of point of interest, such as restaurant, ATM, etc.), location of the point of interest, a phone number, hours of operation, etc. The map database 103a also includes indexes 215. The indexes 215 may include various types of indexes that relate the different types of data to each other or that relate to other aspects of the data contained in the geographic database 103a.

The data stored in the map database 103a in the various formats discussed above may help in provide precise data for high-definition mapping applications, autonomous vehicle navigation and guidance, cruise control using ADAS, direction control using accurate vehicle maneuvering and other such services. In some embodiments, the system 101 accesses the map database 103a storing data in the form of various layers and formats depicted in FIGS. 2B-2D.

FIG. 3A-FIG. 3B collectively illustrate schematic diagrams of working examples of the system, in accordance with an example embodiment. Specifically, FIG. 3 illustrates distance calculation performed by the distance calculation module 201b. Two exemplary working examples are shown, a first working example 301 and a second working example 303. FIG. 3A includes a road object 311, a link 315, a link width 305, a link center 321, and a first distance 307. FIG. 3B includes a road object 313, a link 317, a link width 319, a link center 323, and a second distance 309. In accordance with an embodiment, the system 101 may calculate the first distance 307 associated with the first road object 311. The first distance 307 is a length of a perpendicular bisector from the location of the road object 311 to the link center 321, which is a center point for the link 315 that is determined as a point falling on a line running midway through the link 315. The location of the road object 311 is equivalent to the second location for the road object 311 that is determined by the location detection module 201c.

Further, the second distance 309 is a length of a perpendicular bisector from the location of the road object 313 to the link center 323 (or center point for the link 317 determined in a manner similar to center point 321 mentioned above) of the link 317. The link width 305 is a width of the link 315. The link width 319 is a width of the link 317.

In accordance with an embodiment, the system 101 may compare each of the first distance 307 and the second distance 309 with a predefined threshold. These comparisons may be performed by the distance calculation module 201b shown in FIG. 2A. According to an example embodiment the predefined threshold set as half of the width of the corresponding link. For example, for the road object 311, the predefined threshold is half of the width 305 of the link 315. Similarly, for the road object 313, the predefined threshold is half of the width 319 of the link 317. The first distance 307 is compared with half of the link width 305. The second distance 309 is compared with half of the link width 319. As may be observed from FIG. 3A and FIG. 3B, the first distance 307 is greater than the half of the link width 305. The second distance 309 is lesser than the half of the link width 319.

In accordance with an embodiment, the second location of the road object 311 (or the road object 313), or the sign, is determined by using all of the previous information like the timestamp used for map matching the location of the road object. A point based or a path-based map matcher could be used along with road object's pre and post positionEstimates. The result of the map matching process is then analyzed by the system 101. Specifically, for each construction related road object that is map matched, the length of a perpendicular bisector to the center point of the corresponding link is analyzed. If the length of the perpendicular bisector is significantly more than the half width (that is the predefined threshold) of the corresponding link, this indicates that the construction related road object is not placed exactly on the road but possibly on the sidewalk and is not intended to affect traffic. In accordance with an embodiment, the system 101 may suppress the road observation associated with the road object when the distance is greater than the predefined threshold. When the distance is greater than the predefined threshold, then it is assumed that the road object is kept on sidewalk of the link associated or map matched with the road object, and so it is not affecting traffic route. Further, if road objects are identified to be placed on sidewalk of the link, then the map data is updated to suppress the road observation associated with the road objects.

In FIG. 3A, the first distance 307 is greater than the half of the link width 305, so the road object 311 is assumed to be kept on sidewalk of the link 315. Further, the map data is updated to suppress the road observation associated with the road object 311. In FIG. 3B, the second distance 309 is lesser than the half of the link width 319, so the road object 313 is assumed to be kept on the link 317 itself.

In accordance with an embodiment, the system 101 may retain the road observation associated with the road object when the distance is lesser than the predefined threshold. The second distance 309 is lesser then the half of the link width 319, hence the system 101 may retain the road observation associated with the road object 313. The exemplary scenario of the system 101 are further described in FIG. 4A and FIG. 4B.

In accordance with an additional embodiment, when construction related road objects are identified, which were moved to the side of road or the link after completion of road work, a blacklist is maintained by the system 101. The locations of one or more such road objects placed on the side of the link are identified using sensor data and are added to maintain a list. Then polygons are formed around the locations of these one or more road objects and these polygons. This list is then blacklisted, that is indicated as a list not intended for use for processing, and the blacklist that is accessed in real time by end users. This blacklist would prevent construction related road observations identified by locations in the list, that are within these blacklisted polygons, to be processed further. The blacklist indicates that there was once active construction with road objects and barricades blocking one of more lanes and those road objects are now moved to the side of the road. The blacklist further indicates that construction information is present, but it does not actively interfere with safe travel of vehicles. That is to say, these road objects do not interfere with safe travel of vehicles on the link where these corresponding road objects are placed. The blacklist may be updated periodically by the system 101.

FIG. 4A illustrates an exemplary scenario of a working example of the system for updating map data, in accordance with an example embodiment. The working example 400a may include a plurality of vehicles (403a, 403b, . . . 403n), a link 405 and a road object 401. The road object 401 is a construction related road object for example, lane detour ahead. The road object 401 is in the middle of the link 405. The length of perpendicular bisector from the road object 401 to the center point of the link is lesser than the predefined threshold. According to an example embodiment, road objects that are construction related are filtered from a set of plurality of road objects. These construction related road objects include construction start, construction ahead, detour, road close, lane closed and road narrows. The construction related road objects are filtered by applying a filter on the set of plurality of road objects, since they can generate false positive road works warning if they are not processed correctly. Thus, road observation associated with the road object 401 is a true road observation, and the road observation site is a true construction site. So, the road observation associated with the road object 401 is retained on the map data.

FIG. 4B illustrates an exemplary scenario of a working example of the system for updating map data, in accordance with an example embodiment. The working example 400b may include plurality of vehicles (405a, 405b, . . . 405n), a link 409 and a road object 407. The road object 407 is a construction related road object for example, lane detour ahead. The road object 407 is on sidewalk of the link 409. The length of perpendicular bisector from the road object 407 to the center point of the link 409 is greater than the predefined threshold. Thus, road observation associated with the road object 407 is a false road observation, and the roadwork has ended. Despite the "construction" related road objects are moved to the side of the road/link by traffic operators after road work is concluded, the road objects are still observed and reported by sensor data. Essentially, a false positive road work warning is created due to the observation of "construction related" road objects that are on the side of the road and does not affect traffic since road works has ended. So, the road observation associated with the road object 407 is suppressed on the map data. This is further explained using the methods shown in FIG. 5 and FIG. 6 described below.

FIG. 5 illustrates a flow diagram of a method 500 for updating map data in accordance with an example embodiment. It will be understood that each block of the flow diagram of the method 500 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 101, employing an embodiment of the present invention and executed by a processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 500 illustrated by the flowchart diagram of FIG. 5 is updating map data. Fewer, more, or different steps may be provided.

At step 501, the method 500 comprises obtaining, from one or more user equipment, sensor data associated with a road object. The sensor data may for example be image data of road objects, road signs, or the surroundings. In accordance with an embodiment, the sensor data may refer to the data captured by the vehicle using sensors. As discussed in FIG. 1, the user equipment 105 may be a dedicated vehicle (or a part thereof) for gathering data for development of the map data in the database 103*a*. Additionally, the user equipment 105 may be any user accessible device such as a mobile phone, a smartphone, a portable computer, and the like, as a part of another portable/mobile object such as a vehicle. A road object may be any road sign. Road objects give information about the road conditions ahead, provide instructions to be followed at the major crossroads or junctions, warn, or guide drivers, and ensure proper functioning of road traffic. According to an example embodiment of the present disclosure, road work or construction related signs are filtered from a plurality of road objects. Filtering of road objects is done by applying a machine learning algorithm. Filtering process is explained in detail in FIG. 6.

At step 503, the method 500 comprises determining a first location of a road observation sight associated with the sensor data and a timestamp associated with the road observation sight. The first location may correspond to the location of the user equipment 105 at the time of road object observation. The system 101 may determine the first location by extracting the timestamp of the signRecognition message 201*a*1-1. Further, a match of the same timestamp is found in the positionEstimate message 201*a*2-1.

At step 505, the method 500 comprises, determining a second location of the road object based on a timestamp associated with the first location. The second location may correspond to the location of the road object. The system 101 may determine the second location with the help of the first location of the road observation sight obtained in previous step of method 500.

The second location of the road object is determined by applying the positionOffsets 201*a*1-3 in the signRecognition message 201*a*1-1 to the first location from the previous step.

At step 507, the method 500 comprises, calculating a distance associated with the second location of the road object and a center point of a link, where the link is a map matched link associated with the second location. In the map matching process, a point based, or a path-based map matcher could be used along with sign's pre and post positionEstimates 201*a*2-1. The result of the map matching process is then analyzed by the system 101. Specifically, for each road object that is map matched, the distance is calculated from the second location of the road object to the center point of the link. The distance is a length of the perpendicular bisector from the center point of the link to the second location.

At step 509, the method 500 comprises, updating the map data based on the calculated distance. For updating the map data, the calculated distance is compared with a predefined threshold. In some example embodiments, the predefined threshold is half of width of the link, associated with the road object. The result of the comparison is then analyzed by the system 101. After analyzing the result, road observation is updated on the map database, this step is described in detail in FIG. 6.

In this manner, the method 500 may be configured to enable navigation of vehicles in a real-time and reliable manner. The method 500 may be implemented using corresponding circuitry. For example, the method 500 may be implemented by an apparatus or system comprising a processor, a memory, and a communication interface of the kind discussed in conjunction with FIG. 2.

In some example embodiments, a computer programmable product may be provided. The computer programmable product may comprise at least one non-transitory computer-readable storage medium having stored thereon computer-executable program code instructions that when executed by a computer, cause the computer to execute the method 500.

In an example embodiment, an apparatus for performing the method 500 of FIG. 5 above may comprise a processor (e.g., the processor 201) configured to perform some or each of the operations of the method 500. The processor may, for example, be configured to perform the operations (501-509) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (501-509) may comprise, for example, the processor 201 which may be implemented in the system 101 and/or a device or circuit for executing instructions or executing an algorithm for processing information as described above.

FIG. 6 illustrates another flow diagram of a method 600 for updating map data, in accordance with an example embodiment. At step 601, the method 600 comprises, filtering construction related road objects from a plurality of road objects. The plurality of road objects may include road traffic signs such as stop, one way traffic, left turn, right turn, bumpy road, pedestrian crossing, and the like. From the plurality of road objects, construction related road objects are filtered. Construction related road objects may include road signs such as construction start, construction ahead, detour, road close, lane closed and road narrows.

At step 603, the method comprises applying a machine learning algorithm on the plurality of road observations. For filtering construction related road objects from the plurality of road objects, a machine learning algorithm is applied on the plurality of road objects. The system 101 may perform clustering on the plurality of road objects. For example. Density-Based Spatial Clustering of Applications with Noise (DBSCAN) clustering may be performed on the plurality of road objects. The DBSCAN algorithm is based on an intuitive notion of "clusters" and "noise". Clusters are dense regions in the data space, separated by regions of the lower density of points. DBSCAN is a density-based clustering algorithm: given a set of points in some space, it groups together points that are closely packed together (points with many nearby neighbors), marking as outliers points that lie alone in low-density regions (whose nearest neighbors are too far away).

At step 605, the method comprises, suppressing the road observation associated with the road object when the distance is greater than the predefined threshold. According to an example embodiment, the predefined threshold is half of the width of the link. The predefined threshold is dynamic which is dependent on road/link width. According to an example embodiment, the system 101 may suppress the road observation if the map matched perpendicular bisector's length is greater than the predefined threshold. The road observation could be suppressed on the user equipment (i.e. edge) and not sent over the channel to the cloud if the vehicle's processors can do the map matching step. In another implementation of the present disclosure, the road observation is suppressed in the cloud if map matching step is performed in the cloud. In another implementation of the present disclosure, instead of totally suppressing the road observation, in the cloud, estimated road works confidence may be reduced if the construction related road objects have perpendicular bisectors indicating that the road object is beyond the side of the road/link.

At step 607, the method comprises, retaining the road observation associated with the road object when the distance is lesser than the predefined threshold. The method 600 further comprises, retaining the road observation associated with the road object when worker presence or heavy-duty vehicle equipment are observed by the sensor data. Further, the road observation is retained when the speed of a vehicle in the vicinity of the first location, is above the speed limit or in a free flow mode. Real time probes may be extracted by the system 101 and analysis may be done by the processor to see if traffic is impacted. If traffic is not impacted it is further confirmation that the road objects are indeed not intended to affect traffic. Traffic impact could be travel speed reduction, lane closed, lane restricted, or lane width reduced. The sensor vehicle speed or other vicinity vehicles speed may be compared to historical speed patterns to verify if the traffic is impacted. Additionally, the construction related road objects that are potential sources of road works false positives are identified. The system 101 may be configured to form polygons around the road objects' locations and add these polygons to a blacklist that is accessed in real time by users. The blacklist would prevent construction related observations that are within these blacklisted polygons to be processed further. The blacklist could be updated periodically on the OEM cloud 109.

In this way, example embodiments of the disclosure results in updating map data. The present disclosure also provides updating the map data that may be associated with a region, such as a construction site. After completion of a road work, construction related signs are moved to the side of a link. Such construction related signs are still observed by sensors of vehicles passing through the region. Thus, such false observation of construction related signs such as, lane detour, construction site ahead, lane closed etc., may indicate ongoing road work even after road work has ended. It may further cause unnecessary transition from autonomous mode to manual mode, in autonomous or semi-autonomous vehicles. To that end, the present disclosure facilitates updated navigation instructions related to routing of traffic in the presence of such construction related signs.

In this manner, the present disclosure provides efficient and user-friendly techniques for updating navigation instructions. Along with this, in some embodiments, most of the processing is done by a remote server based or cloud-based server, so the end user may be able to leverage fast processing and improved storage benefits provided by the present disclosure. Thus, the navigation instructions may be generated based on up-to-date and real time data, providing accurate and reliable navigation services to the end users.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for updating map data of a map database, the system comprising:
 a memory configured to store computer-executable instructions; and
 at least one processor configured to execute the computer-executable instructions to:
  obtain, in real time from one or more user equipment, sensor data associated with a road object;
  determine a first location of a road observation sight associated with the sensor data and a timestamp associated with the road observation sight;
  determine a second location of the road object based on the timestamp, the sensor data and the first location;
  calculate a distance associated with the second location of the road object and a center point of a link represented in the map data of the map database, wherein the link is a map matched link associated with the second location; and
  dynamically update the map data of the map database in real time based on the calculated distance.

2. The system of claim 1, wherein the distance is a length of a perpendicular bisector from the center point of the link to the second location.

3. The system of claim 2, wherein to update the map data based on calculated distance, the at least one processor is further configured to:
compare the distance with a predefined threshold.

4. The system of claim 3, wherein the predefined threshold is half of width of the link, associated with the road object.

5. The system of claim 3, wherein to update the map data based on calculated distance, the at least one processor is further configured to:
suppress the road observation associated with the road object when the distance is greater than the predefined threshold.

6. The system of claim 3, wherein to update the map data based on calculated distance, the at least one processor is further configured to:
retain the road observation associated with the road object when the distance is lesser than the predefined threshold.

7. The system of claim 6, wherein to update the map data, the at least one processor is further configured to:
retain the road observation associated with the road object when worker presence or heavy duty vehicle equipment are observed by the sensor data, associated with one or more user equipment; and
retain the road observation associated with the road object when speed of a vehicle in vicinity of the first location, is above a predefined speed limit.

8. The system of claim 1, wherein the at least one processor is further configured to:
filter construction related road objects from a plurality of road objects.

9. The system of claim 8, wherein to filter construction related road objects, the at least one processor is further configured to:
apply a machine learning algorithm on corresponding road observations associated with the plurality of road objects.

10. A method for updating map data of a map database, the method comprising:
obtaining, in real time from one or more user equipment, sensor data associated with a road object;
determining a first location of a road observation sight associated with the sensor data and a timestamp associated with the road observation sight;
determining a second location of the road object based on the timestamp, the sensor data and the first location;
calculating a distance associated with the second location of the road object and a center point of a link represented in the map data of the map database, wherein the link is a map matched link associated with the second location; and
dynamically updating the map data of the map database in real time based on the calculated distance.

11. The method of claim 10, wherein the distance is a length of a perpendicular bisector from the center point of the link to the second location.

12. The method of claim 10, wherein updating the map data based on calculated distance, comprises:
comparing the distance with a predefined threshold.

13. The method of claim 12, wherein the predefined threshold is half of width of the link, associated with the road object.

14. The method of claim 12, wherein updating the map data based on calculated distance, comprises:
suppressing the road observation associated with the road object when the distance is greater than the predefined threshold.

15. The method of claim 10, wherein updating the map data based on calculated distance, comprises:
retaining the road observation associated with the road object when the distance is lesser than the predefined threshold.

16. The method of claim 15, wherein updating the map data based on the calculated distance, comprises:
retaining the road observation associated with the road object when worker presence or heavy duty vehicle equipment are observed by the sensor data, associated with the one or more user equipment; and
retaining the road observation associated with the road object when speed of a vehicle in vicinity of the first location, is above a predefined speed limit.

17. The method of claim 10, further comprising:
filtering construction related road objects from a plurality of road objects.

18. The method of claim 17, wherein filtering the construction related road objects further comprises:
maintaining a list, wherein the list comprises locations of one or more road objects placed on the side of the link; and
blacklisting the list, wherein the blacklisting indicates that the construction related road objects do not interfere with a safe travel on the link.

19. A computer program product comprising a non-transitory computer readable medium having stored thereon computer executable instructions which when executed by at least one processor, cause the processor to conduct operations for updating map data of a map database, the operations comprising:
obtaining, in real time from one or more user equipment, sensor data associated with a road object;
determining a first location of a road observation sight associated with the sensor data and a timestamp associated with the road observation sight;
determining a second location of the road object based on the timestamp, the sensor data, and the first location;
calculating a distance associated with the second location of the road object and a center point of a link represented in the map data of the map database, wherein the link is a map matched link associated with the second location;
dynamically updating the map data of the map database based on the calculated distance.

20. The system of claim 1, wherein the updated map data of the map database is used for controlling an autonomous driving mode of a vehicle.

* * * * *